US012105959B2

(12) United States Patent
Palmer et al.

(10) Patent No.: US 12,105,959 B2
(45) Date of Patent: Oct. 1, 2024

(54) SUSPENDING OPERATIONS OF A MEMORY SYSTEM

(71) Applicant: Micron Technology, Inc., Boise, ID (US)

(72) Inventors: David Aaron Palmer, Boise, ID (US); Giuseppe Cariello, Boise, ID (US); Fulvio Rori, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 25 days.

(21) Appl. No.: 17/884,429

(22) Filed: Aug. 9, 2022

(65) Prior Publication Data

US 2024/0053894 A1   Feb. 15, 2024

(51) Int. Cl.
    *G06F 3/06* (2006.01)
(52) U.S. Cl.
    CPC .......... *G06F 3/0611* (2013.01); *G06F 3/0629* (2013.01); *G06F 3/0659* (2013.01); *G06F 3/0679* (2013.01)
(58) Field of Classification Search
    CPC .... G06F 3/0611; G06F 3/0629; G06F 3/0659; G06F 3/0679
    See application file for complete search history.

(56) References Cited

U.S. PATENT DOCUMENTS

| 10,042,587 | B1* | 8/2018 | Pedersen | G11C 16/10 |
|---|---|---|---|---|
| 10,134,474 | B1* | 11/2018 | Chen | G11C 16/26 |
| 2012/0179860 | A1* | 7/2012 | Falanga | G11C 16/102 711/155 |
| 2018/0174652 | A1* | 6/2018 | Terada | G06F 12/00 |
| 2020/0026465 | A1* | 1/2020 | Jung | G06F 12/0246 |
| 2020/0233769 | A1* | 7/2020 | Koizumi | G11C 5/14 |
| 2022/0068391 | A1* | 3/2022 | Tortorelli | G11C 16/24 |
| 2022/0156142 | A1* | 5/2022 | Feng | G06F 11/0766 |

* cited by examiner

*Primary Examiner* — Sean D Rossiter
(74) *Attorney, Agent, or Firm* — Holland & Hart LLP

(57) ABSTRACT

Methods, systems, and devices for suspending operations of a memory system are described. A memory system may be configured to perform a write operation to store data in a nonvolatile memory device, where the write operation includes storing information in one or more latches associated with the nonvolatile memory device; receive a suspend command to suspend performance of the write operation based on a request to perform a read operation associated with a higher-priority than the write operation; suspend the performance of the write operation based on receiving the suspend command; transmit the information stored in the one or more latches associated with the nonvolatile memory device to a host system based on suspending the performance of the write operation; and perform the read operation based at least in part on transmitting the information to the host system.

25 Claims, 8 Drawing Sheets

SUSPENDING OPERATIONS OF A MEMORY SYSTEM

FIELD OF TECHNOLOGY

The following relates to one or more systems for memory, including suspending operations of a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not- or (NOR) and not- and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Aspects of this disclosure relate to one or more systems for memory, including suspending operations of a memory system. Some memory systems may receive commands from a host system to store and retrieve data. The memory system retrieves the requested data from a memory device (e.g., a nonvolatile memory device) that is subsequently transferred to the host system. Memory controllers within the memory systems perform the operations to store and retrieve the data with the memory device. These read and write operations may be examples of multi-step sequences of operations that are operating independently from the host system. The host controller in the memory system may request the memory controller to suspend its operation to perform specific operations. The memory controller may be performing a particular sequence of operations when a suspend command is received. Currently, the performance of the memory system may be adversely impacted by receipt of a suspend command depending upon the sequence of operations being performed.

In some memory systems, the firmware in the system controller, that is the host for the memory devices, may determine that a read operation performed by a memory device may benefit from the use of an extended access operation. For example, the host system may determine whether the use of extended error-control access operations would be useful based on the error condition in the LDPC engine or based on statistic, topology or other predictive methods. This use of error-control access operations may not be allowed during suspend status due to resource limitations in the memory device. In fact, the suspension of the current operations of the memory system may permit the use of resources that are not currently in use by the suspended operation. In such cases, the memory system may wait to complete the suspended operation before performing the error-correcting access operations (e.g., a read operation that uses a more robust error control operation). Such action may negatively affect the quality of service (QoS) associated with the memory system.

Implementations described herein address the aforementioned shortcomings and other shortcomings by providing a suspend-to-host command to offload information stored in latches that may be affected if the error control access operations are initiated. Use of a suspend-to-host command may permit the memory system to suspend its current access operation and allow the transfer of the current information stored in latches before the error control access operations use latches. Once the error control access operations have concluded, the memory system may restore the transferred information using the information offloaded to the host system. With the information restored to latches, the initial access operation may be restarted from a state matching the conditions when the suspend-to-host command was received.

Figure 1:
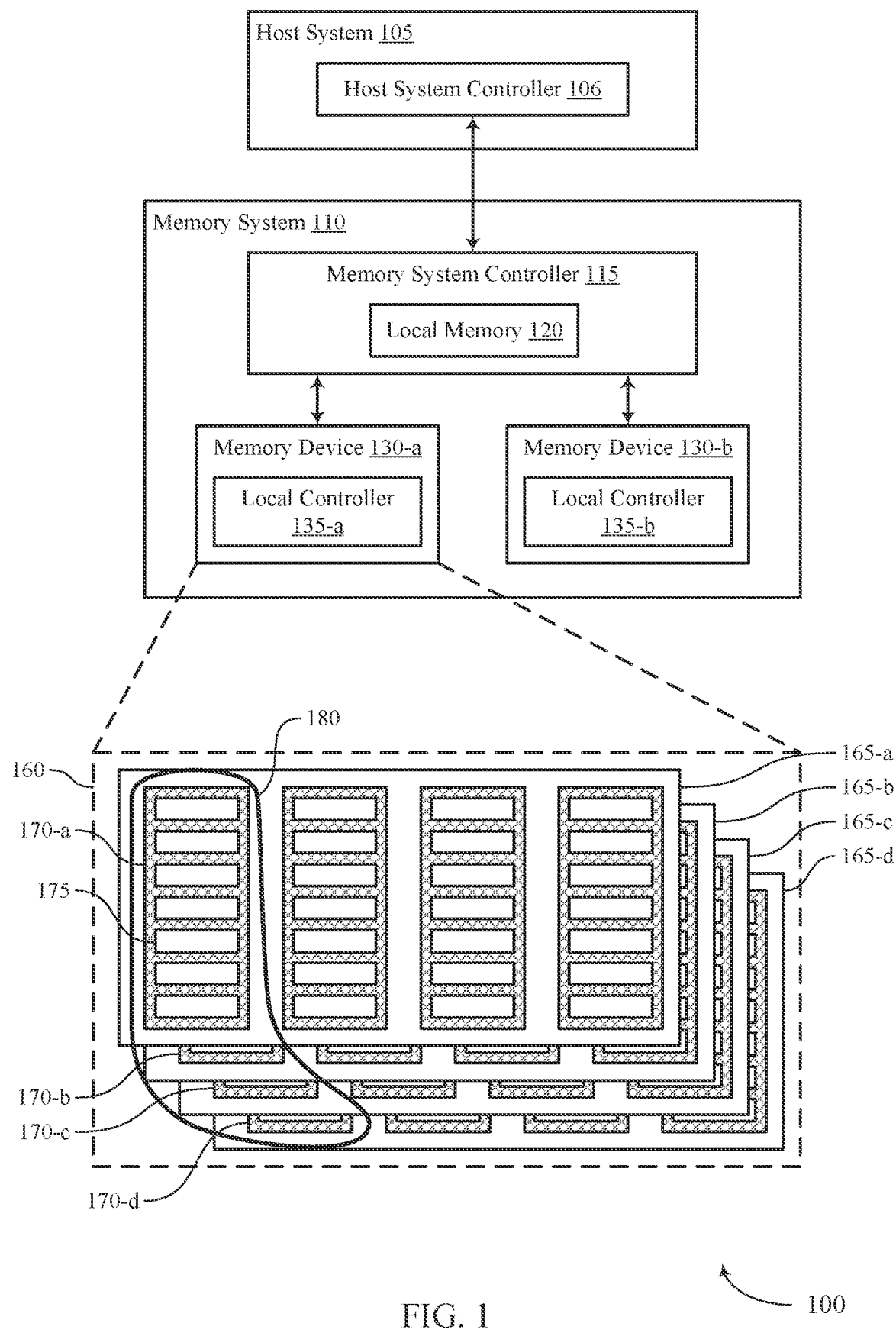
FIG. 1 illustrates an example of a system that supports suspending operations of a memory system in accordance with examples as disclosed herein.
Figure 2:
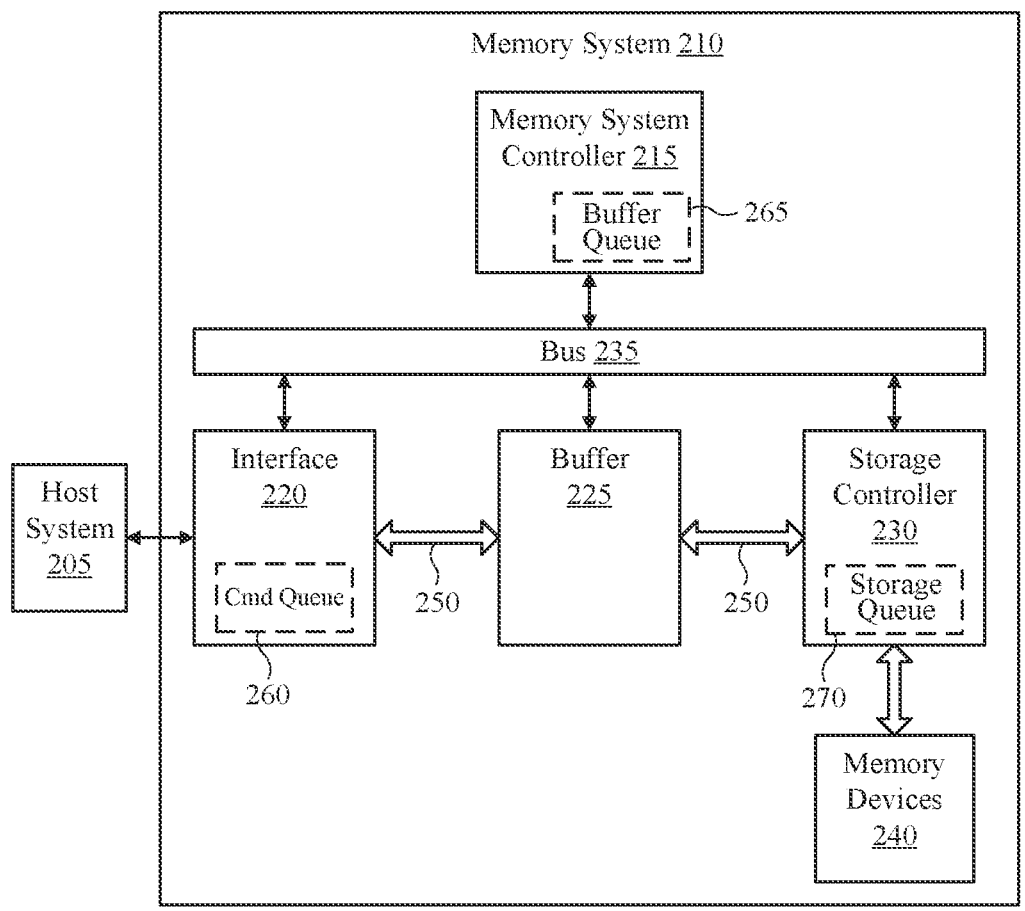
FIG. 2 illustrates an example of a system that supports suspending operations of a memory system in accordance with examples as disclosed herein.

Features of the disclosure are initially described in the context of systems, devices, and circuits with reference to FIGS. 1 through 2. Features of the disclosure are described in the context of data exchanges between a host system and a NAND memory system with reference to FIGS. 3 through 6. These and other features of the disclosure are further illustrated by and described in the context of an apparatus diagram and flowchart that relate to suspending operations of a memory system with reference to FIGS. 7 through 8.

FIG. 1 illustrates an example of a system 100 that supports suspending operations of a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a universal flash storage (UFS) device, an embedded multi-media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a fiber channel interface, a small computer system interface (SCSI), a serial attached SCSI (SAS), a double data rate (DDR) interface, a DIMM interface (e.g., DIMM socket interface that supports DDR), an Open NAND flash interface (ONFI), and a low power double data rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 also may be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 also may include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random-access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide-based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases. NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wear out considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained, and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that supports suspending operations of a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as suspend-to-host command operations described herein.

The suspend-to-host command offloads information stored in latches associated with a suspended operation if a higher priority error correcting access operation is performed. Use of a suspend to host command permits the memory system to suspend its operation allowing the transfer of the information before the error correcting access operations use these resources. Once the error correcting access operations have concluded, the memory system may restore the transferred information using the data offloaded to the host computing device. With the information restored to the values contained within the memory resources, the memory controller may be restarted from a state matching the conditions when the suspend to host command was received.

FIG. 2 illustrates an example of a system 200 that supports suspending operations of a memory system in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This also may allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225.

That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

Figure 3:
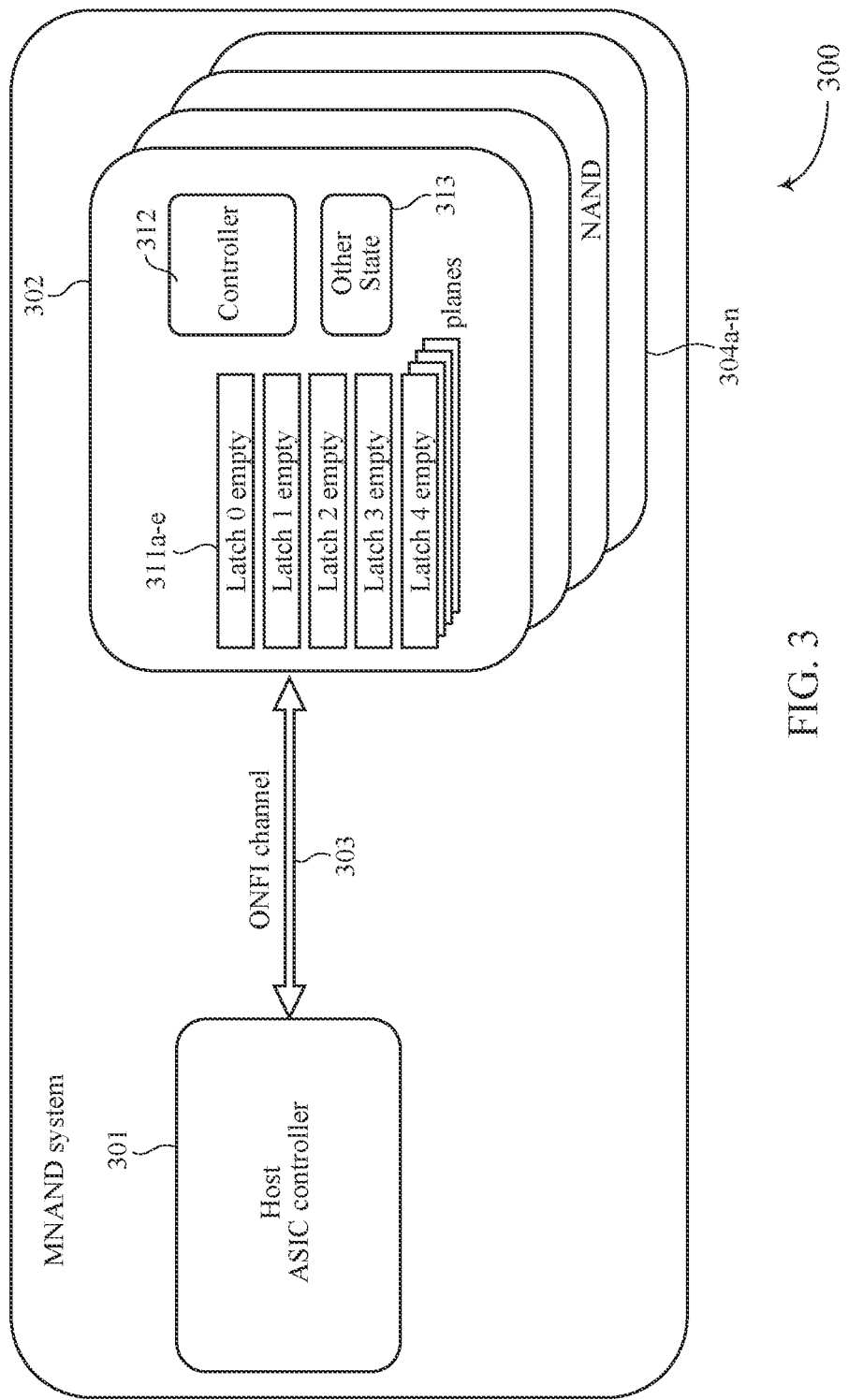
FIG. 3 illustrates an example of a system 300 that supports suspending operations of a memory system in accordance with examples as disclosed herein.

The suspend-to-host command may offload information associated with a suspended access operation from its current location within the memory system (e.g., latches) in response to the information being affected if a higher priority error correcting access operation is performed. Use of a suspend-to-host command permits the memory system 210 to suspend its operation allowing the transfer of the information before the error correcting access operations use these resources. The suspend-to-host command may be performed by the memory system controller 215, the storage controller 230, if present, and a combination of both controllers. Once the error correcting access operations have concluded, the memory system may restore the transferred information using the data offloaded to the host computing device. With the information restored to the latches, the suspended operations may be restarted from a state matching the conditions when the suspend to host command was received FIG. 3 illustrates an example of a system 300 that supports NAND suspending operations of a memory system in accordance with examples as disclosed herein. A host system controller 301 that is part of host system 105 communicates a memory system 302 over an Open NAND Flash Interface (ONFI) channel 303. The memory system 302 may include a plurality of memory planes 304a-n being supported by a memory controller 312, a set of data latches 311a-e, and a set of other information 313. The set of data latches 311a-e, and a set of other information 313 contain information used by the memory controller 312 while performing operations comprising memory read operations, memory write operations, and error control access operations.

The host system controller 301 transmits access commands to the memory controller 312 causing the memory controller 312 to read and write data into the memory planes 304a-n. The host system controller 301 may request the memory controller 312 to suspend a previously transmitted access command to perform another, more urgent, access. Alternatively, the host system controller 301 may transmit an access command to the memory controller 312 while a previously transmitted access command is being performed and the memory controller 312 determines whether a newly received access command possesses a higher priority than a partially executed access command that is being performed. In response to such requests, the partially executed access command may be suspended to permit the higher priority access command to proceed immediately.

For the higher priority access command to be executed, information contained within the set of data latches 311a-e and the set of other information 313 may be in use by the partially executed access command. As part of the suspend command (or part of a separate request), this information contained within the set of data latches 311a-e and the set of other information 313 may be transferred to the host system before the higher priority access command is performed. Once the higher priority access command has completed, the information may be restored into the set of data latches 311a-e and the set of other information 313 allowing the partially executed access command to continue. The other information 313 may include state information associated with the memory system, statistical information associated with a totality of operations performed by the memory system since a start-up, other statistical information associated with the memory system, other types of information, or any combination thereof.

Figure 4:
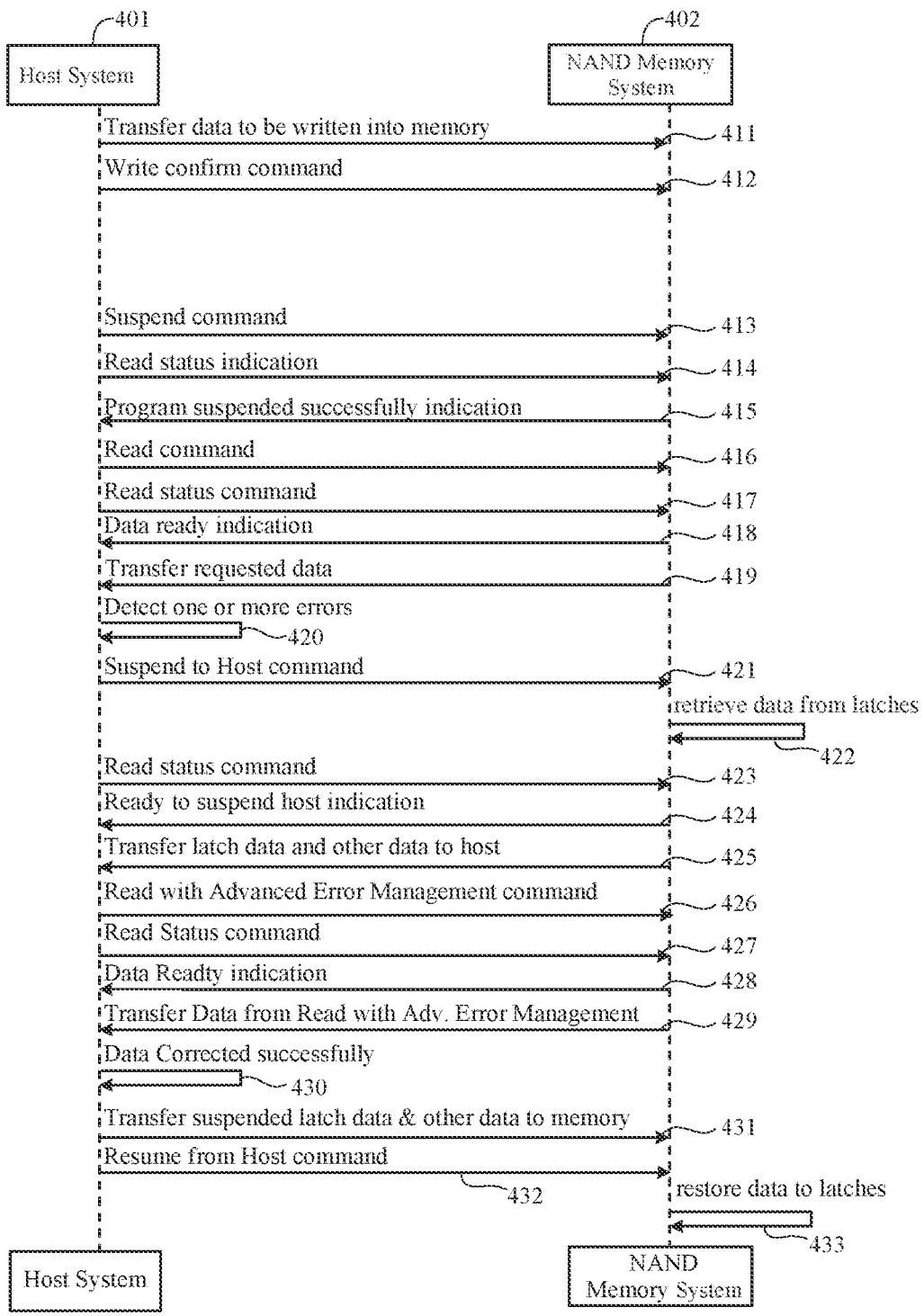
FIG. 4 illustrates an example signal sequence diagram 400 performed by the system 400 that supports suspending operations of a memory system in accordance with examples as disclosed herein.

FIG. 4 illustrates an example signal sequence diagram 400 performed by the system 300 that supports suspending operations of a memory system in accordance with examples as disclosed herein. The host system 401 is shown exchanging messages with the memory system 402 in support of a suspending operations of a memory system. The sequence of messages begins with the host system 401 sending a data to be written to the memory system 411 followed by a write confirm command 412. This write operation is performed in the memory system 402 until the host system 401 sends a suspend command 413 and a read status command 414. The memory system 402 responds with a program suspended successfully indication 415.

In response to receiving the indication 415, the host system 401 may communicate a command to perform a higher-priority access operation. In some cases, the higher-priority access operation may be an example of a read operation. The host system 401 sends a read command 416 that includes an address to be read by the memory system 402 followed by a read status command 417. In some examples, if the read operation is successful, the memory system 402 obtains the data at the requested address and responds with a data ready indication 418 and then sends the requested data 419. The host system 401 detects one or more errors 420 within the requested data and sends a suspend-to-host command 421 to the memory system 402. In some cases, the detected one or more errors may be correctable.

The memory system controller 402 retrieves the information stored in one or more latches 422 of the memory system 402. The information in the latches may be used as part of performing the write operation that was previously suspended. The suspension of operations of a memory system continues with the host system 401 sending a read status command 423 causing the memory system 402 to respond with a ready to suspend-to-host indication 424 if ready and then transfers the information stored in the latches 425 (and other data) to the host system 401. The host system 401 may store the information received from the memory system, while sending a read command that includes an advanced error management command 426 at the address associated with the prior read command. The memory system 402 may perform the read the information from the address and perform one or more error control operations on the data. In some cases, the one or more error control operations may use the one or more latches to store information related to the one or more error control operations. The one or more error control operations may include examples of error detection operations, error correction operations, or error detection and correction operations. The host system 401 sends a read status command 427 that causes the memory system 402 to send a data ready indication 428 and transfers the read data associated with the read with advanced error management command 429 to the host system 401.

The host system 401 determines that the read data received from the memory system 402 is corrected successfully 430. The host system 401 sends the latch contents associated with the suspended operation 431 (and other data) to the memory system 402 in response to determining that the data is correct. The host system 401 sends a resume from host command 432 causing the memory system 402 to restore the received information into the latches 433 permitting the suspended write operation in the memory system 402 to resume.

In some examples, as described above with reference to FIG. 4, the host system 401 may be configured to send a suspend command, a read command, and then a suspend-to-host command after the initial read operation provides data with one or more errors (e.g., uncorrectable errors). In other examples, the host system 401 may send a single command that includes the features of the suspend command the suspend-to-host command. In some instances, the single command may indicate that the memory system 402 is to perform the one or more error control operations as part of the initial read operation. In such instances, the memory system 402 may transfer the contents of the latches to the host system 401 before performing the initial read operation. In some examples, the suspend-to-host command may be an example of an acknowledgement or a negative acknowledgement associated with the data received as part of the initial read operation.

Figure 5A:
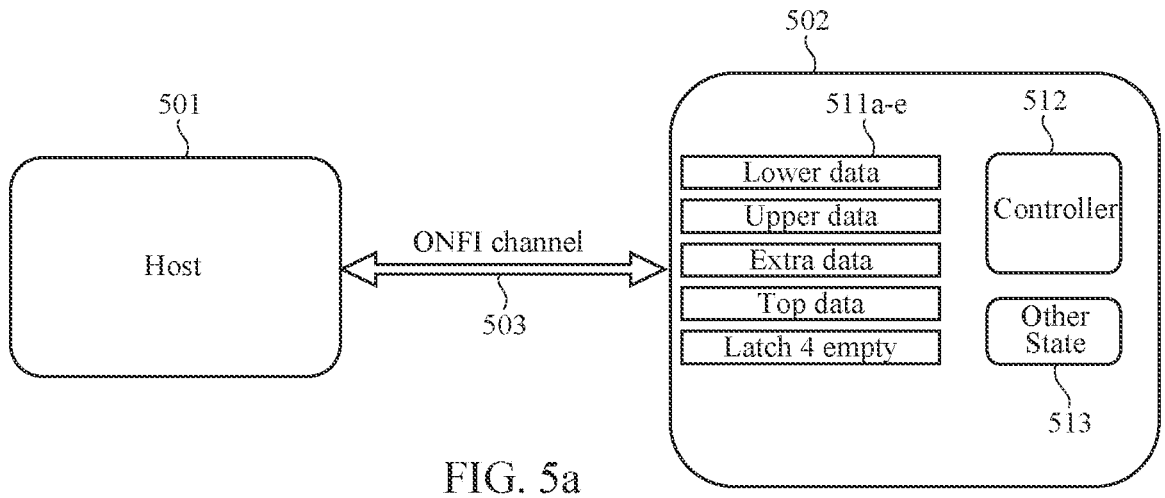
FIGS. 5a-c illustrate the example memory system operating state of the system 300 that supports suspending operations of a memory system in accordance with examples as disclosed herein.
Figure 5B:
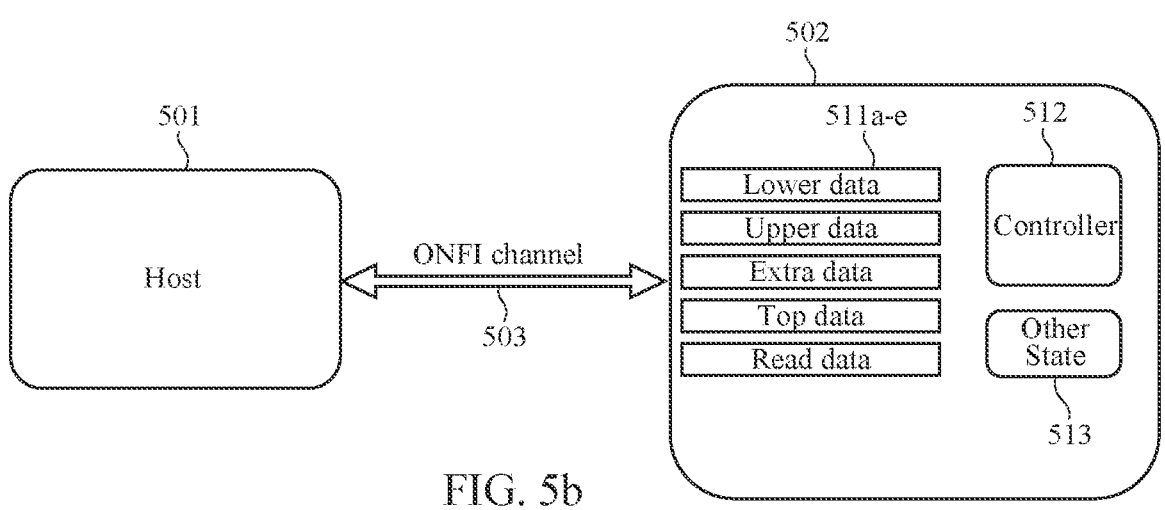
Figure 5C:
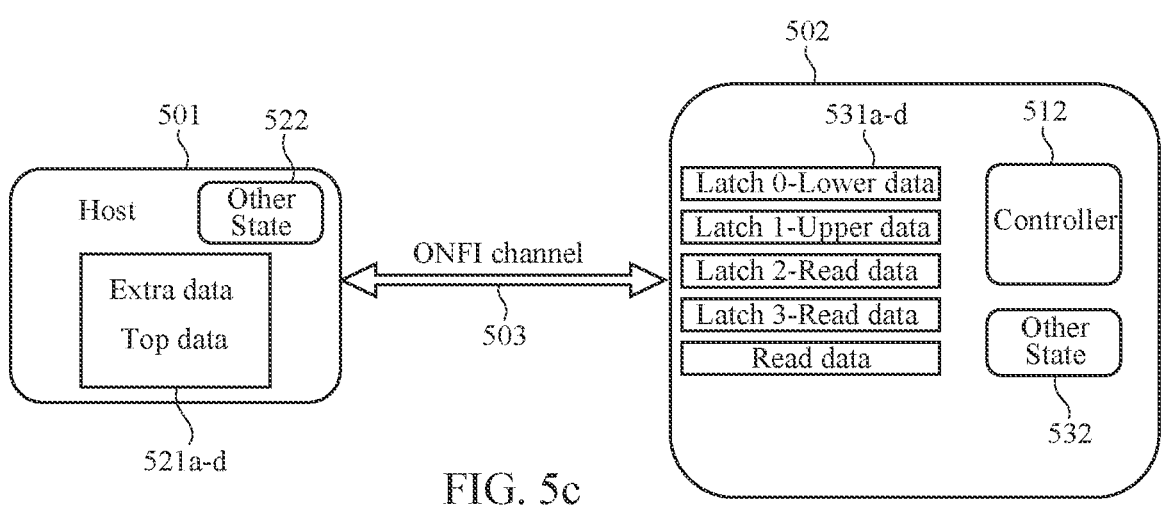

FIGS. 5a-c illustrate example memory system operating state of the system 300 that supports NAND suspending operations of a memory system in accordance with examples as disclosed herein. FIG. 5a shows the set of data latches 511a-e, and other data 513, within a memory system 502 prior to a host system 501 initiating a suspend-to-host operation. The host system 501 and the memory system 502 may communicate using an ONFI channel 503. The memory system 502 may include a controller 512. Data latch 0-data latch 3 may include a set of latches that store information associated with the suspended access operation of the memory system 502. Data Latch 4 of the set of data latches 511a-e is shown being empty in this example. The memory system 502 may also contain other data 513.

FIG. 5b shows the set of data latches 511a-e, and other data 513, in response to the data read operation occurring following the suspension of a write operation in the memory system 502. Once again, data latch 0-data latch 3 contain information associated with the suspended write operation. Data Latch 4 of the set of data latches 511a-e contains read data retrieved from the memory system in response to the read command. The memory system 502 may also contain other data 513.

FIG. 5c shows the host system 501 and the memory system 502 during execution of a read with advanced error management command. Some or all of the information 521a-d, and other data 522, previously stored within the set of data latches 531a-e and other data 532, may be stored in the host system 501 during the operation of the suspend-to-host operation. In the illustrative example of FIG. 5c, the extra data associated with programming operation and the top data associated with the programming operation (in latches 2 and 3, respectively) are transferred to the host system 501. In such examples, latches 2 and 3 can then be used for read data. In other examples, the data stored in any quantity of latches (e.g., latches 0, 1, 2, and/or 3) may be transferred to the host system 501 and those latches reused to store read data. The information 521a-d, and other data 522, is returned to the set of data latches 531a-e and other data 532, as part of the termination of the suspend-to-host operations. The empty latches may be capable of being used to store additional information associated with the read operation and one or more error control operations.

Figure 6:
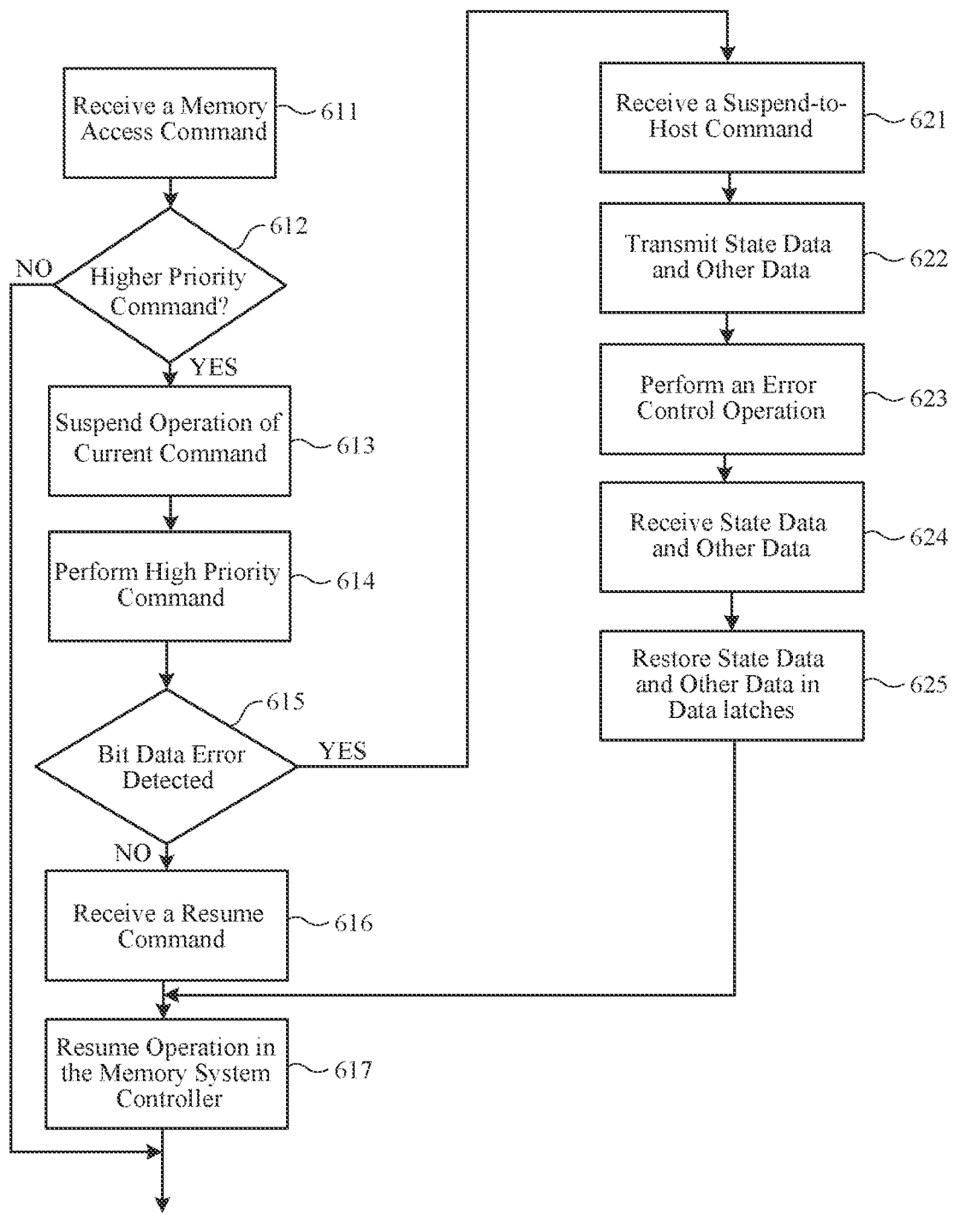
FIG. 6 illustrates a flowchart corresponding to a method performed by software components of a system 300 supporting suspending operations of a memory system in accordance with examples as disclosed herein.

FIG. 6 illustrates a flowchart corresponding to a method performed by software components of a system supporting suspending operations of a memory system in accordance with examples as disclosed herein. The process flow 600 as the memory system is performing a write operation as described herein. An access command is received at 611. For example, a memory system (e.g., memory system 110) receives the access command from a host system (e.g., host system 105). The access command can be received at the controller (e.g., controller 115) of the memory system.

At 612, the received access command is compared with a currently executing operation to determine whether the received access command is a higher priority than the currently executing operation. If not, the process flow 600 of a suspend-to-host operation ends. If the received command is determined to be a higher priority command, operation of the currently executing operation is suspended at 613.

The higher priority command is performed at 614. For example, a read operation may be requested returning retrieved data from the memory system. The retrieved data is sent to the error control engine (e.g., an error correction engine) for decoding at 615 (e.g., to check for presence of one or more errors—such as uncorrectable errors). If no uncorrectable error is detected (e.g., all codewords in the read data are successfully decoded), a resume operation command is received at 616 causing the suspended operating program to resume at 617.

If one or more errors (e.g., uncorrectable errors) are detected at 615, a suspend-to-host command is received at 621. At 622, information stored in a set of data latches (and other data) associated with the suspended write operation may be transmitted to the host system. Such actions may permit a subsequent read operation to use an error control operation that uses the latches at 623. The information retrieved from the set of data latches is received by the memory system from the host system at 624. The information is restored into the set of data latches (and other data is restored) at 625. The process flow 600 continues to 617 causing the suspended write operation to resume.

Aspects of the process flow 600 may be implemented by a controller, among other components. Additionally or alternatively, aspects of the process flow 600 may be implemented as instructions stored in memory (e.g., firmware stored in a memory coupled with memory system controller 110). For example, the instructions, when executed by a controller (e.g., the memory system controller 110), may cause the controller to perform the operations of the process flow 600.

Figure 7:
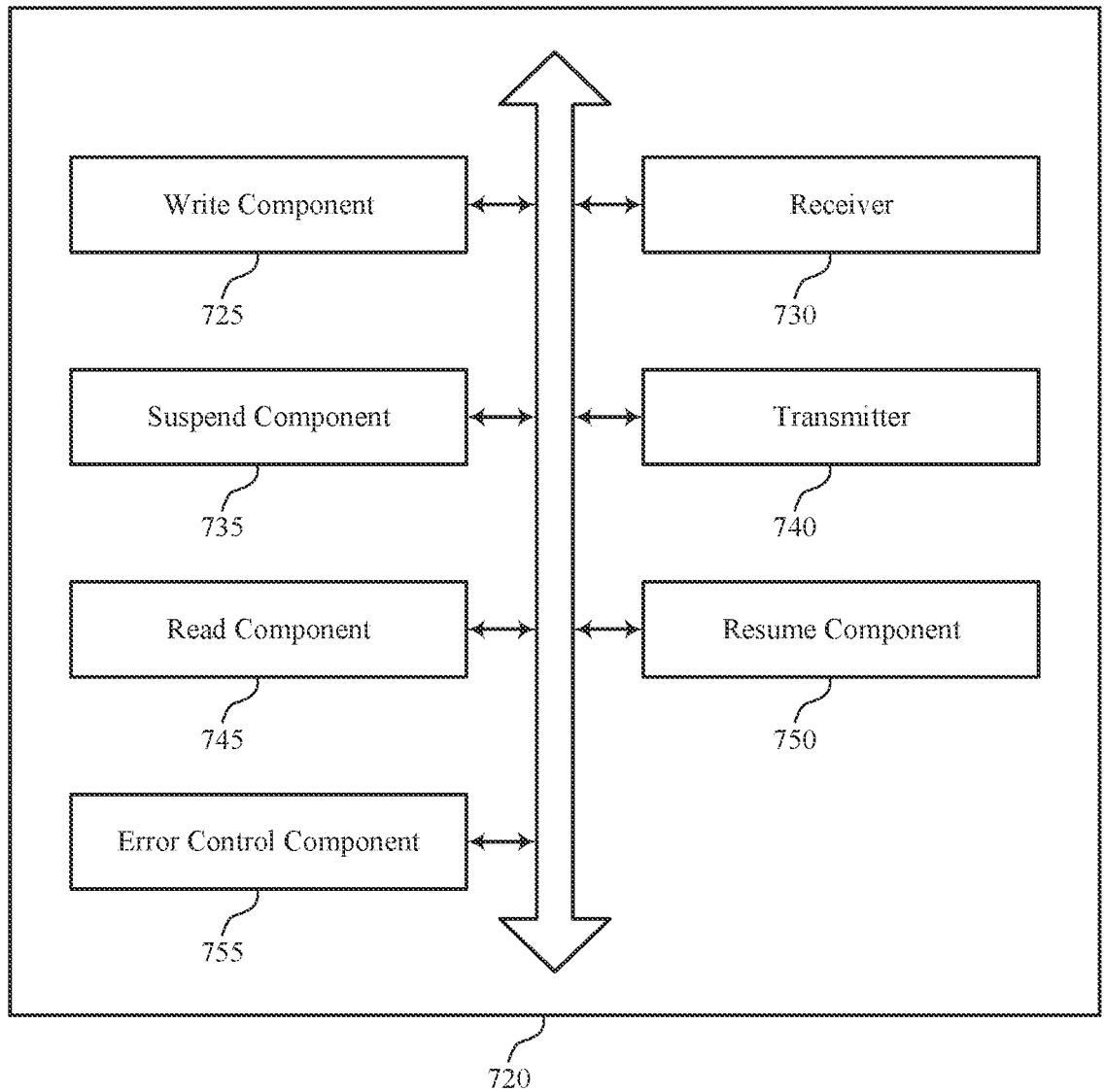
FIG. 7 shows a block diagram of a memory system that supports suspending operations of a memory system in accordance with examples as disclosed herein.

FIG. 7 shows a block diagram 700 of a memory system 720 that supports suspending operations of a memory system in accordance with examples as disclosed herein. The memory system 720 may be an example of aspects of a memory system as described with reference to FIGS. 1 through 6. The memory system 720, or various components thereof, may be an example of means for performing various aspects of suspending operations of a memory system as described herein. For example, the memory system 720 may include a write component 725, a receiver 730, a suspend component 735, a transmitter 740, a read component 745, a resume component 750, an error control component 755, or any combination thereof. Each of these components may communicate, directly or indirectly, with one another (e.g., via one or more buses).

The write component 725 may be configured as or otherwise support a means for performing a write operation to store data in a nonvolatile memory device of a memory system, the write operation including storing information in one or more latches associated with the nonvolatile memory device. The receiver 730 may be configured as or otherwise support a means for receiving a suspend command to suspend performance of the write operation based at least in part on a request to perform a read operation associated with a higher priority than the write operation. The suspend component 735 may be configured as or otherwise support a means for suspending the performance of the write operation based at least in part on receiving the suspend command. The transmitter 740 may be configured as or otherwise support a means for transmitting the information stored in the one or more latches associated with the nonvolatile memory device to a host system based at least in part on suspending the performance of the write operation. The read component 745 may be configured as or otherwise support a means for performing the read operation based at least in part on transmitting the information to the host system.

In some examples, the read component 745 may be configured as or otherwise support a means for determining whether the read operation generates second data includes a bit error. In some examples, the receiver 730 may be configured as or otherwise support a means for receiving a resume command to resume the write operation based at least in part on determining that the second data includes the bit error. In some examples, the resume component 750 may be configured as or otherwise support a means for resuming the performance of the write operation based at least in part on receiving the resume command.

In some examples, the receiver 730 may be configured as or otherwise support a means for receiving the information from the host system based at least in part on completing performance of the read operation, where receiving the resume command is based at least in part on receiving the information.

In some examples, the receiver 730 may be configured as or otherwise support a means for receiving a suspend-to-host command after suspending the performance of the write operation, where transmitting the information is based at least in part on receiving the suspend-to-host command.

In some examples, the error control component 755 may be configured as or otherwise support a means for performing a first error control operation as part of the read operation, where receiving the suspend-to-host command is based at least in part on performing the first error control operation.

In some examples, the error control component 755 may be configured as or otherwise support a means for performing a second error control operation as part of the read operation in response to receiving the suspend-to-host command.

In some examples, transmitting the information is based at least in part on receiving the suspend command.

In some examples, the transmitter 740 may be configured as or otherwise support a means for transmitting an indication to the host system that the information associated with the one or more latches is ready based at least in part on receiving the suspend-to-host command, where transmitting the information to the host system is based at least in part on transmitting the indication to the host system.

In some examples, the receiver 730 may be configured as or otherwise support a means for receiving the information from the host system based at least in part on completing performance of the read operation. In some examples, the receiver 730 may be configured as or otherwise support a means for receiving a resume command to resume the write operation based at least in part on receiving the information. In some examples, the resume component 750 may be configured as or otherwise support a means for resuming the performance of the write operation based at least in part on receiving the resume command.

In some examples, the information stored in the one or more latches includes state information that defines a current operating state of the memory system. In some examples, the transmitter 740 may be configured as or otherwise support a means for transmitting the state information to the host system based at least in part on suspending the performance of the write operation.

In some examples, the state information includes current operational state information associated with a memory controller and the nonvolatile memory device during the performance of the write operation.

In some examples, the receiver 730 may be configured as or otherwise support a means for receiving the information from the host system based at least in part on completing the read operation. In some examples, the resume component 750 may be configured as or otherwise support a means for storing the information into the one or more latches associated with the nonvolatile memory device based at least in part on receiving the information. In some examples, the receiver 730 may be configured as or otherwise support a means for receiving a resume command to resume the write operation based at least in part on completing the read operation. In some examples, the resume component 750 may be configured as or otherwise support a means for resuming the performance of the write operation based at least in part on storing the information into the one or more latches.

In some examples, the transmitter 740 may be configured as or otherwise support a means for transmitting a ready indication to the host system indicating that the information associated with the one or more latches is ready for transmission based at least in part on receiving a suspend-to-host command, where transmitting the information to the host system is based at least in part on transmitting of the ready indication to the host system.

In some examples, the restored information is written into the nonvolatile memory device from the one or more latches based at least in part on receiving the resume command from the host system.

Figure 8:
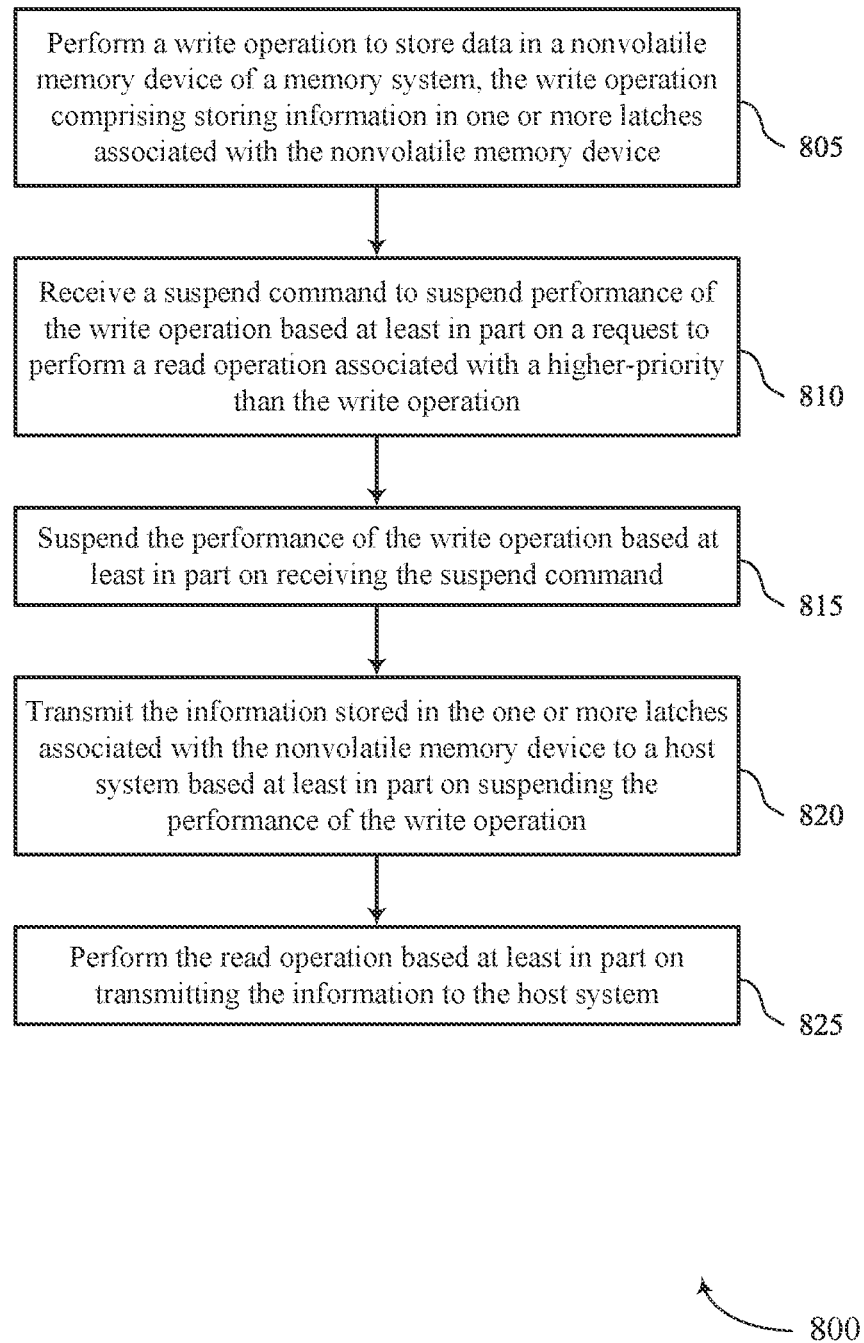
FIG. 8 shows a flowchart illustrating a method or methods that support suspending operations of a memory system in accordance with examples as disclosed herein.

FIG. 8 shows a flowchart illustrating a method 800 that supports suspending operations of a memory system in accordance with examples as disclosed herein. The operations of method 800 may be implemented by a memory system or its components as described herein. For example, the operations of method 800 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 805, the method may include performing a write operation to store data in a nonvolatile memory device of a memory system, the write operation including storing information in one or more latches associated with the nonvolatile memory device. The operations of 805 may be performed in accordance with examples as disclosed herein. In some examples, aspects of the operations of 805 may be performed by a write component 725 as described with reference to FIG. 7.

At 810, the method may include receiving a suspend command to suspend performance of the write operation based at least in part on a request to perform a read operation associated with a higher priority than the write operation. The operations of 810 may be performed in accordance with examples as disclosed herein. In some examples, aspects of the operations of 810 may be performed by a receiver 730 as described with reference to FIG. 7.

At 815, the method may include suspending the performance of the write operation based at least in part on receiving the suspend command. The operations of 815 may be performed in accordance with examples as disclosed herein. In some examples, aspects of the operations of 815 may be performed by a suspend component 735 as described with reference to FIG. 7.

At 820, the method may include transmitting the information stored in the one or more latches associated with the nonvolatile memory device to a host system based at least in part on suspending the performance of the write operation. The operations of 820 may be performed in accordance with examples as disclosed herein. In some examples, aspects of the operations of 820 may be performed by a transmitter 740 as described with reference to FIG. 7.

At 825, the method may include performing the read operation based at least in part on transmitting the information to the host system. The operations of 825 may be performed in accordance with examples as disclosed herein. In some examples, aspects of the operations of 825 may be performed by a read component 745 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing a write operation to store data in a nonvolatile memory device of a memory system, the write operation including storing information in one or more latches associated with the nonvolatile memory device; receiving a suspend command to suspend performance of the write operation based at least in part on a request to perform a read operation associated with a higher-priority than the write operation; suspending the performance of the write operation based at least in part on receiving the suspend command; transmitting the information stored in the one or more latches associated with the nonvolatile memory device to a host system based at least in part on suspending the performance of the write operation; and performing the read operation based at least in part on transmitting the information to the host system.

Aspect 2: The method, apparatus, or non-transitory computer-readable medium of aspect 1, further including operations, features, circuitry, logic, means, or instructions, or any combination thereof for determining whether the read operation generates second data includes a bit error; receiving a resume command to resume the write operation based at least in part on determining that the second data includes the bit error; and resuming the performance of the write operation based at least in part on receiving the resume command.

Aspect 3: The method, apparatus, or non-transitory computer-readable medium of aspect 2, further including operations, features, circuitry, logic, means, or instructions, or any combination thereof for receiving the information from the host system based at least in part on completing performance of the read operation, where receiving the resume command is based at least in part on receiving the information.

Aspect 4: The method, apparatus, or non-transitory computer-readable medium of any of aspects 1 through 3, further including operations, features, circuitry, logic, means, or instructions, or any combination thereof for receiving a suspend-to-host command after suspending the performance of the write operation, where transmitting the information is based at least in part on receiving the suspend-to-host command.

Aspect 5: The method, apparatus, or non-transitory computer-readable medium of aspect 4, further including operations, features, circuitry, logic, means, or instructions, or any combination thereof for performing a first error control operation as part of the read operation, where receiving the suspend-to-host command is based at least in part on performing the first error control operation.

Aspect 6: The method, apparatus, or non-transitory computer-readable medium of aspect 5, further including operations, features, circuitry, logic, means, or instructions, or any combination thereof for performing a second error control operation as part of the read operation in response to receiving the suspend-to-host command.

Aspect 7: The method, apparatus, or non-transitory computer-readable medium of any of aspects 5 through 6 where transmitting the information is based at least in part on receiving the suspend command.

Aspect 8: The method, apparatus, or non-transitory computer-readable medium of any of aspects 5 through 7, further including operations, features, circuitry, logic, means, or instructions, or any combination thereof for transmitting an indication to the host system that the information associated with the one or more latches is ready based at least in part on receiving the suspend-to-host command, where transmitting the information to the host system is based at least in part on transmitting the indication to the host system.

Aspect 9: The method, apparatus, or non-transitory computer-readable medium of any of aspects 1 through 8, further including operations, features, circuitry, logic, means, or instructions, or any combination thereof for receiving the information from the host system based at least in part on completing performance of the read operation: receiving a resume command to resume the write operation based at least in part on receiving the information; and resuming the performance of the write operation based at least in part on receiving the resume command.

Aspect 10: The method, apparatus, or non-transitory computer-readable medium of any of aspects 1 through 9, where the information stored in the one or more latches includes state information that defines a current operating state of the memory system.

Aspect 11: The method, apparatus, or non-transitory computer-readable medium of any of aspect 10 where the state data includes current operational state information associated with a memory controller and the nonvolatile memory device during the performance of the write operation.

Aspect 12: The method, apparatus, or non-transitory computer-readable medium of aspect 10, further including operations, features, circuitry, logic, means, or instructions, or any combination thereof for receiving the information from the host system based at least in part on completing the read operation; storing the information into the one or more latches associated with the nonvolatile memory device based at least in part on receiving the information; receiving a resume command to resume the write operation based at least in part on completing the read operation; and resuming the performance of the write operation based at least in part on storing the information into the one or more latches.

Aspect 13: The method, apparatus, or non-transitory computer-readable medium of aspect 12, further including operations, features, circuitry, logic, means, or instructions, or any combination thereof for transmitting a ready indication to the host system indicating that the information associated with the one or more latches is ready for transmission based at least in part on receiving a suspend-to-host command, where transmitting the information to the host system is based at least in part on transmitting of the ready indication to the host system.

Aspect 14: The method, apparatus, or non-transitory computer-readable medium of any of aspects 12 through 13 where the restored information is written into the nonvolatile memory device from the one or more latches based at least in part on receiving the resume command from the host system.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed, and second condition or action may occur directly as a result of the previous condition or action occurring, such that no other intermediate conditions or actions occur between the earlier condition or action and the second condition or action, or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A nonvolatile memory device, comprising:
processing circuitry, wherein the processing circuitry is configured to cause the nonvolatile memory device to:
perform a write operation to store data in the nonvolatile memory device, the write operation comprising storing information in one or more latches associated with the nonvolatile memory device;
receive a suspend command to suspend performance of the write operation based at least in part on a request to perform a read operation associated with a higher-priority than the write operation;
suspend the performance of the write operation based at least in part on receiving the suspend command;
transmit, to a host system based at least in part on suspending the performance of the write operation, the information associated with the write operation, wherein the information is stored in the one or more latches associated with the nonvolatile memory device prior to transmitting the information;
perform the read operation based at least in part on transmitting the information to the host system; and receive, from the host system, the information associated with the write operation based at least in part on completing performance of the read operation.

2. A nonvolatile memory device, comprising:
processing circuitry, wherein the processing circuitry is configured to cause the nonvolatile memory device to:
perform a write operation to store data in the nonvolatile memory device, the write operation comprising storing information in one or more latches associated with the nonvolatile memory device;
receive a suspend command to suspend performance of the write operation based at least in part on a request to perform a read operation associated with a higher-priority than the write operation;
suspend the performance of the write operation based at least in part on receiving the suspend command;
transmit the information stored in the one or more latches associated with the nonvolatile memory device to a host system based at least in part on suspending the performance of the write operation;
perform the read operation based at least in part on transmitting the information to the host system;
determine whether the read operation generates second data that includes a bit error;
receive a resume command to resume the write operation based at least in part on determining that the second data includes the bit error; and
resume the performance of the write operation based at least in part on receiving the resume command.

3. The nonvolatile memory device of claim 2, wherein the processing circuitry is further configured to cause the nonvolatile memory device to:
receive the information from the host system based at least in part on completing performance of the read operation, wherein receiving the resume command is based at least in part on receiving the information.

4. The nonvolatile memory device of claim 1, wherein the processing circuitry is further configured to cause the nonvolatile memory device to:
receive a suspend-to-host command after suspending the performance of the write operation, wherein transmitting the information is based at least in part on receiving the suspend-to-host command.

5. The nonvolatile memory device of claim 4, wherein the processing circuitry is further configured to cause the nonvolatile memory device to:
perform a first error control operation as part of the read operation, wherein receiving the suspend-to-host command is based at least in part on performing the first error control operation.

6. The nonvolatile memory device of claim 5, wherein the processing circuitry is further configured to cause the nonvolatile memory device to:
perform a second error control operation as part of the read operation in response to receiving the suspend-to-host command.

7. The nonvolatile memory device of claim 5, wherein transmitting the information is based at least in part on receiving the suspend command.

8. The nonvolatile memory device of claim 5, wherein the processing circuitry is further configured to cause the nonvolatile memory device to:
transmit an indication to the host system that the information associated with the one or more latches is ready based at least in part on receiving the suspend-to-host command, wherein transmitting the information to the host system is based at least in part on transmitting the indication to the host system.

9. The nonvolatile memory device of claim 1, wherein the processing circuitry is further configured to cause the nonvolatile memory device to:
receive a resume command to resume the write operation based at least in part on receiving the information; and
resume the performance of the write operation based at least in part on receiving the resume command.

10. The nonvolatile memory device of claim 1, wherein:
the information stored in the one or more latches comprises state information that defines a current operating state of the nonvolatile memory device; and
the processing circuitry configured to transmit the information to the host system is further configured to transmit the state information.

11. The nonvolatile memory device of claim 10, wherein the state information comprises current operational state information associated with one or more memory controllers and the nonvolatile memory device during the performance of the write operation.

12. The nonvolatile memory device of claim 1, wherein the processing circuitry is further configured to cause the nonvolatile memory device to:
store the information into the one or more latches associated with the nonvolatile memory device based at least in part on receiving the information;
receive a resume command to resume the write operation based at least in part on completing the read operation; and
resume the performance of the write operation based at least in part on storing the information into the one or more latches.

13. The nonvolatile memory device of claim 12, wherein the processing circuitry is further configured to cause the nonvolatile memory device to:
transmit a ready indication to the host system indicating that the information associated with the one or more latches is ready for transmission based at least in part on receiving a suspend-to-host command, wherein transmitting the information to the host system is based at least in part on transmitting of the ready indication to the host system.

14. The nonvolatile memory device of claim 12, wherein the information stored into the one or more latches is written into the nonvolatile memory device from the one or more latches based at least in part on receiving the resume command from the host system.

15. A non-transitory computer-readable medium storing code, the code comprising instructions executable by one or more processors to:
perform a write operation to store data in a nonvolatile memory device of a memory system, the write operation comprising storing information in one or more latches associated with the nonvolatile memory device;
receive a suspend command to suspend performance of the write operation based at least in part on a request to perform a read operation associated with a higher-priority than the write operation;
suspend the performance of the write operation based at least in part on receiving the suspend command;
transmit, to a host system based at least in part on suspending the performance of the write operation, the information associated with the write operation, wherein the information is stored in the one or more latches associated with the nonvolatile memory device prior to transmitting the information;

perform the read operation based at least in part on transmitting the information to the host system; and receive, from the host system, the information associated with the write operation based at least in part on completing the performance of the read operation.

16. The non-transitory computer-readable medium of claim 15, wherein the instructions are further executable by the one or more processors to:

determine whether the read operation generates second data that includes a bit error;

receive a resume command to resume the write operation based at least in part on determining that the second data includes the bit error; and resume the performance of the write operation based at least in part on receiving the resume command.

17. The non-transitory computer-readable medium of claim 16, wherein receiving the resume command is based at least in part on receiving the information.

18. The non-transitory computer-readable medium of claim 15, wherein the instructions are further executable by the one or more processors to:

receive a suspend-to-host command after suspending the performance of the write operation, wherein transmitting the information is based at least in part on receiving the suspend-to-host command.

19. The non-transitory computer-readable medium of claim 18, wherein the instructions are further executable by the one or more processors to:

perform a first error control operation as part of the read operation, wherein receiving the suspend-to-host command is based at least in part on performing the first error control operation.

20. The non-transitory computer-readable medium of claim 19, wherein the instructions are further executable by the one or more processors to:

perform a second error control operation as part of the read operation in response to receiving the suspend-to-host command.

21. The non-transitory computer-readable medium of claim 19, wherein transmitting the information is based at least in part on receiving the suspend command.

22. A method, comprising:

performing a write operation to store data in a nonvolatile memory device of a memory system, the write operation comprising storing information in one or more latches associated with the nonvolatile memory device;

receiving a suspend command to suspend performance of the write operation based at least in part on a request to perform a read operation associated with a higher-priority than the write operation;

suspending the performance of the write operation based at least in part on receiving the suspend command;

transmitting, to a host system based at least in part on suspending the performance of the write operation, the information associated with the write operation, wherein the information is stored in the one or more latches associated with the nonvolatile memory device prior to transmitting the information;

performing the read operation based at least in part on transmitting the information to the host system; and receiving, from the host system, the information associated with the write operation based at least in part on completing performance of the read operation.

23. The method of claim 22, further comprising:

determining whether the read operation generates second data that includes a bit error;

receiving a resume command to resume the write operation based at least in part on determining that the second data includes the bit error; and resuming the performance of the write operation based at least in part on receiving the resume command.

24. The method of claim 23, wherein receiving the resume command is based at least in part on receiving the information.

25. The method of claim 22, further comprising:

receiving a suspend-to-host command after suspending the performance of the write operation, wherein transmitting the information is based at least in part on receiving the suspend-to-host command.

* * * * *